July 20, 1937.  W. D. FOSTER  2,087,250
FILM HANDLING APPARATUS
Filed June 20, 1933  4 Sheets-Sheet 1
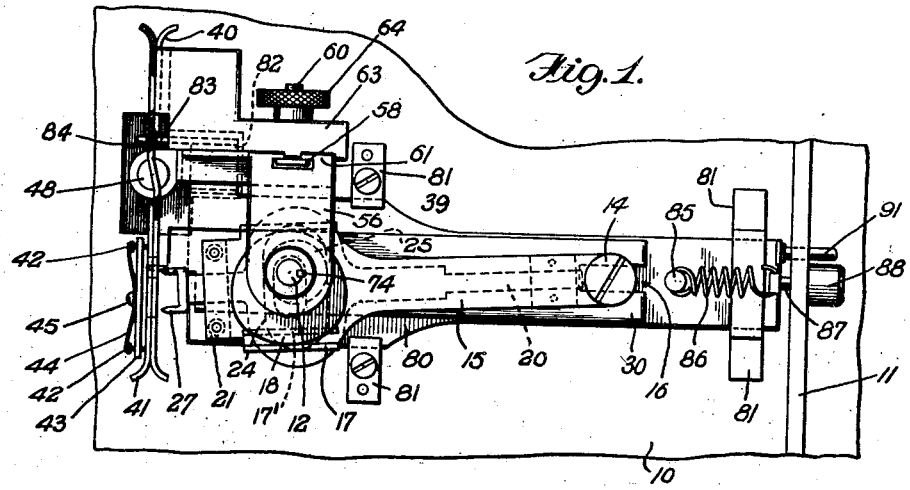
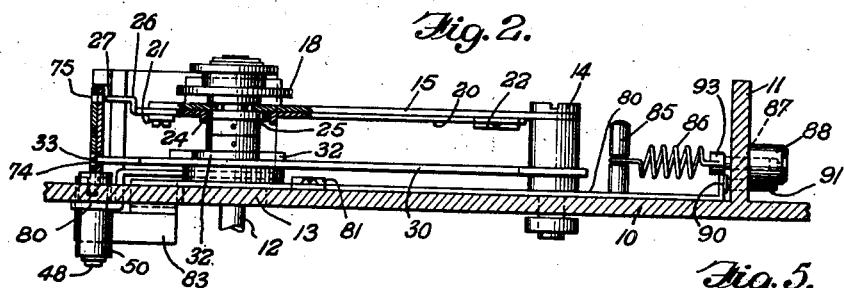
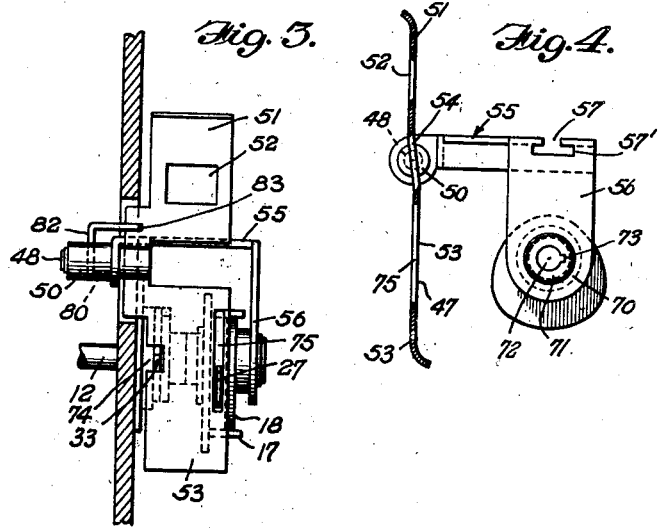
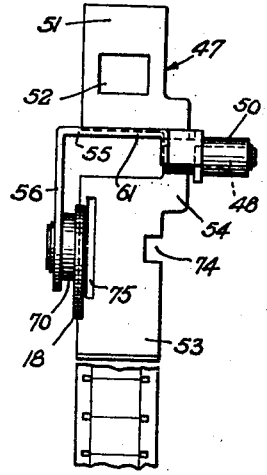
INVENTOR.
Warren Dunham Foster July 20, 1937.  W. D. FOSTER  2,087,250
FILM HANDLING APPARATUS
Filed June 20, 1933   4 Sheets-Sheet 2
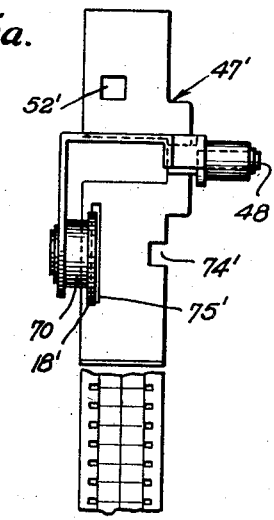
Fig. 5a.
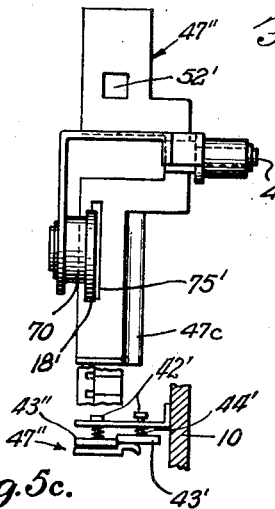
Fig. 5b.
Fig. 5c.
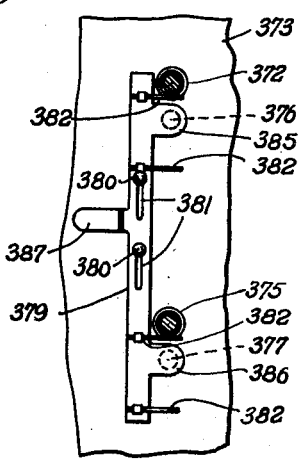
Fig. 21.
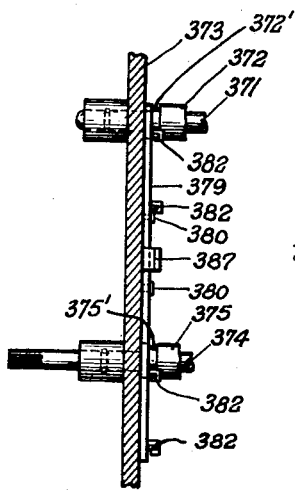
Fig. 22.
Inventor
Warren Dunham Foster July 20, 1937.  W. D. FOSTER  2,087,250
FILM HANDLING APPARATUS
Filed June 20, 1933   4 Sheets-Sheet 3

Inventor
Warren Dunham Foster

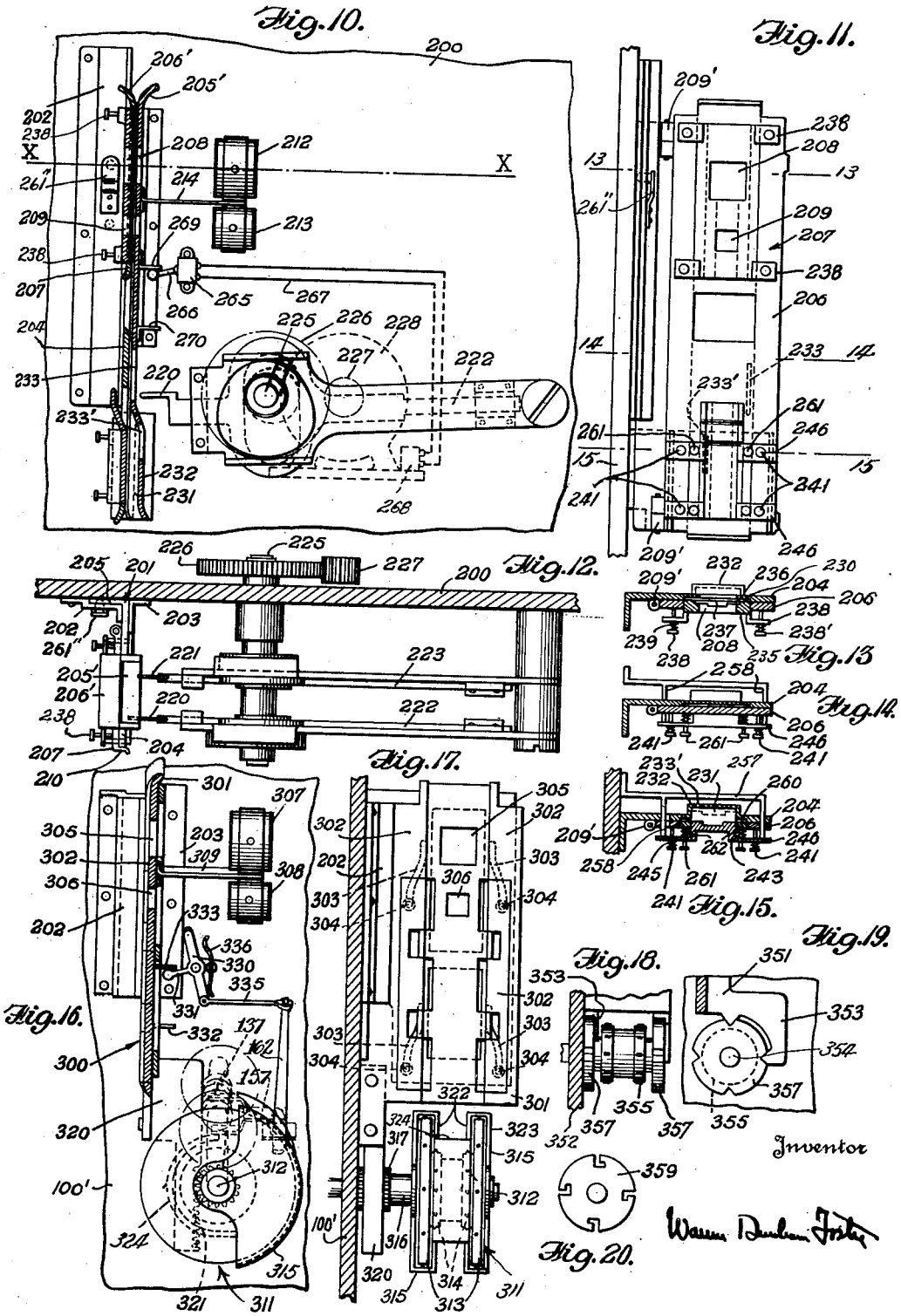

Patented July 20, 1937

2,087,250

UNITED STATES PATENT OFFICE 2,087,250

FILM HANDLING APPARATUS

Warren Dunham Foster, Washington Township, Bergen County, N. J., assignor to Kinatome Patents Corporation, Ridgewood, N. J., a corporation of New York Application June 20, 1933, Serial No. 676,736
In Great Britain June 21, 1932

25 Claims. (Cl. 88—18.4)

This invention relates to film feeding apparatus, whether for the taking printing or projection of successive pictures or for the recording or reproducing of sound, or for a combination of pictures and sound.

Film for use in cinematograph apparatus at the present time and in the immediate future are characterized by several standards of picture area of which the most important are those known as "grandeur" 35 mm., 16 mm., 9½ mm., and 8 mm.

Since picture height and width are generally of substantially the same proportions one to the other irrespective of total area, it has become the trade habit, and is convenient in this specification, to define different standards in terms of width. It should be noted at the outset, however, that much of the subject matter of this invention is concerned primarily with the height and consequent unit of longitudinal travel of films of different standards and that in connection with such longitudinal travel, film standards are stated in terms of width only as a matter of simplicity. That is to say, terms of width are often used merely for their practical convenience in defining height of picture and the length of film travel per individual unit of exposure or projection.

Films of 16 mm. and 9½ mm. in width are in common and international use, primarily in connection with amateur apparatus, and film of the 8 mm. width is about to be placed upon the market internationally. Likewise for amateur use, it is now proposed that negatives of 16 mm. in width be exposed in apparatus of such character that upon the area which according to past practice accommodated one image four images will be exposed. That is to say, successive images will be exposed occupying half of the height and width of a 16 mm. film and thereafter through the manual rethreading and reversal of direction of movement a previously unexposed portion of the film will be exposed to successive images so that one 16 mm. "frame" or picture area will bear four images in place of the one image exposed according to present practice. The negative film so exposed will be either developed as a negative and positive prints made therefrom or reversed according to standard practice into a positive print. In this latter case the resulting positive will be cut longitudinally and the end attached in such fashion that a ribbon of film 8 mm. in width and having perforations upon one side only will result. As a consequence the same amount of negative or positive film will yield four times as many time units of photography and/or projection thus resulting in great economy. A roll of 16 mm. film 25 feet in length when handled in the manner stated above will be the equivalent upon the screen, so far as time of projection and individual images are concerned, of a roll of 16 mm. film of 100 feet in length handled according to present practice.

In view of the facts that in the past two amateur standards 16 mm. and 9½ mm. have existed side by side and that in the future these two standards will be increased to three, it is obviously desirable that a single projector be so constructed that it will accommodate films of different units of film travel and different picture heights and also that cameras be so constructed. For example, the user may wish to secure the greater detail and photographic excellence which is possible from the use of the 16 mm. standard when he is photographing objects or scenes in which he has a particular interest but he may wish to secure the greater economy of the smaller size when he is photographing objects or scenes in which his interest is less keen.

To meet the situation thus created by the existence of different standards, it has been possible separately to construct interchangeable gates and film moving members of different sizes. When the user wishes to change from one size to another he can normally remove the gate with aperture of one height for one standard and manually substitute a gate with aperture of another height for another standard. He can then proceed to change sprockets or other pull down members from one length of effective travel to another and also to change intermittent or other feeding members. As a consequence, at least two operations will be required and there is no assurance that the amateur user in particular will not endeavour to make use of a gate with an aperture height designed for one standard and a feeding element of a distance of travel designed for another standard. Likewise, as is obvious to those skilled in the art, lenses of different characteristics as to coverage and focal length should be used with film of different standards of size and travel.

A very important part of the present invention is the operative interconnection of a removable or interchangeable gate member and removable or interchangeable film feeding means and removable or interchangeable lenses. As a result the gate member and film feeding means and lenses designed for one standard of picture height and film travel may be simultaneously and as a unit removed or interchanged and another similar and complete unit designed for a different standard substituted therefor. Alternatively, this invention includes the provision of means preventing one element designed for one standard being used with another element designed for another standard, as for example a pull-down designed for the 16 mm. standard of film travel with a gate designed with an aperture for a picture of the height of the 8 mm. standard.

It must be understood that in this specification, various specific sizes, such as "16 millimetre" and "8 millimetre", are used for purposes of illustration only. The essence of the invention lies not in any particular size, shape or length of travel of the successive images, but in the differences therein.

Among the important objects of this invention is the provision of mechanism operatively interconnecting the various operable parts of the apparatus so that following or during the change from the use of parts of one standard to the use of parts of another standard, the necessary or desirable operating conditions can be secured. Thus for example, I provide a gate with apertures of different sizes, edge guides movable to positions appropriate for films of the different sizes for which the apertures are designed, lenses of appropriate different characteristics, means to protect the film from the teeth of the feeding means designed for the size which is not being used at the moment, and stretches to provide the needed different lengths of travel of successive images, and actuating mechanism appropriately interconnecting all of said elements, including means for rendering the feeding means inoperable during a change from one standard to another, thereby protecting the film from damage during such changes.

The objects and advantages of the invention will be obvious from the above portion of this specification, the drawings, and the description and claims which follow. It will of course, be understood that for purposes of illustration only, I am presenting certain preferred embodiments, and changes therein may be made without departing from the spirit of my invention, or the scope of the broader claims.

In the drawings:

Figure 1 is a side view of a form of the invention employing a claw feed, part of the apparatus to which my invention is applied being broken away in part.

Figure 2 is a bottom view broken away in part, of the structure of Figure 1.

Figure 3 is a front view, broken away in part, of the gate structure of my invention.

Figure 4 is a side view of the movable gate section of Figure 3 showing an associated cam of certain characteristics carried thereby, such of a gate section being adapted, for example, for use with sixteen millimeter film of the conventional type in which one picture occupies all of the image-bearing portion of each frame.

Figure 5 is a rear view of the structure of Figure 4.

Figure 5a is a rear view of a movable gate section for a film, for example, of sixteen millimeters in with which accommodates four images upon the image-bearing space which in conventional sixteen millimeter film bears one image, with a consequent reduction of each step of each feeding movement.

Figure 5b is a rear view of a movable gate section for a film, for example, of eight millimeters in width, for use with a feeding movement of reduced length.

It will be understood that the gates of Figures 5, 5a, and 5b are interchangeable each for the other, and adapted to be used with the structure of Figures 1 and 2.

Figure 5c is a top view broken away in part of the structure shown in Figure 5b.

Figure 6:
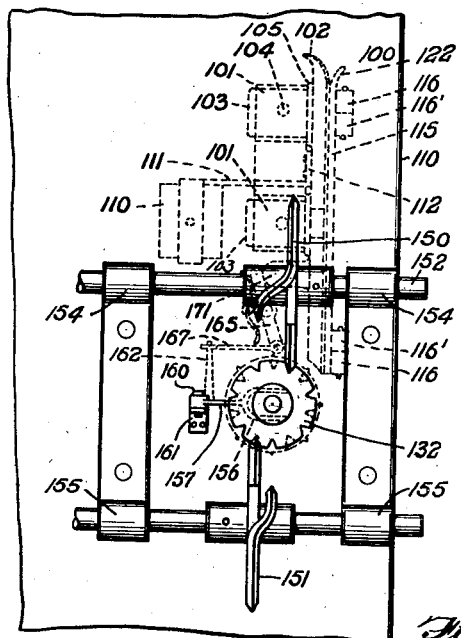

Figure 6 is a partial side view of a form of the invention employing a sprocket film feed with selectively operable driving mechanism therefor, the apparatus to which the invention is applied being shown partly broken away.

Figure 7:
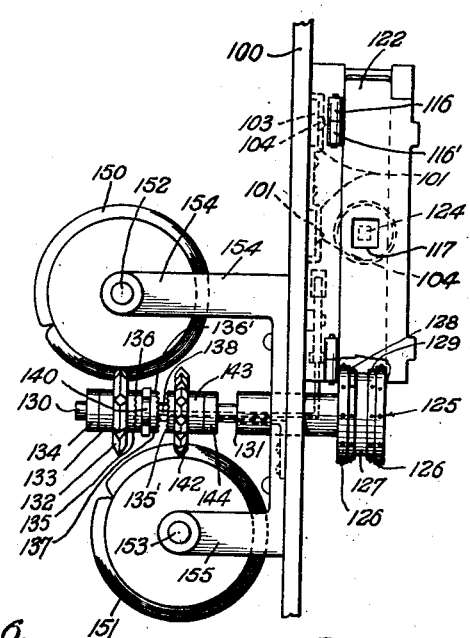

Figure 7 is a partial rear view of the structure of Figure 6.

Figure 8:
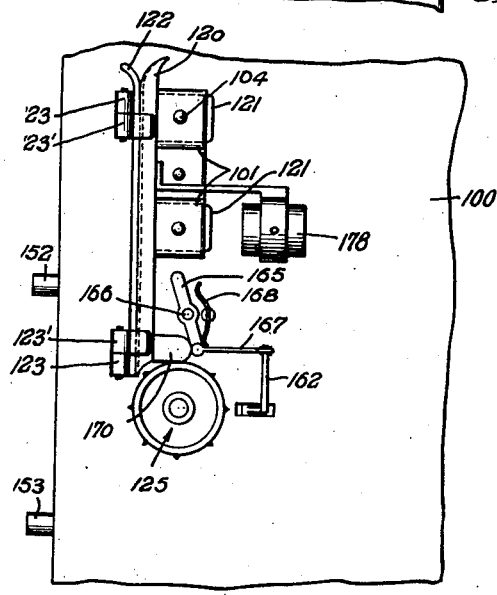

Figure 8 is a side view similar to Figure 6 showing the structure arranged for feeding a film of a different frame height from that of Figure 6.

Figure 9:
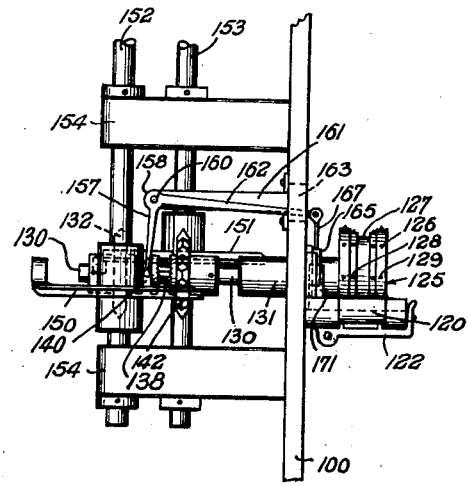

Figure 9 is a partial top view of the structure of Figure 7.

Figure 10 is a side view broken away in part of another form of my invention which employs a feed of the claw or intermittent grip type and requires only a single gate for feeding a plurality of widths of films.

Figure 11 is a partial front view of the structure of Figure 10.

Figure 12 is a partial bottom view of the structure of Figure 10.

Figure 13 is a partial cross-section along the line 13—13 of Figure 11 looking in the direction of the arrows. Figure 14 is a partial cross-section along the line 14—14 of Figure 11 looking in the direction of the arrows. Figure 15 is a partial cross section along the lines of 15—15 of Figure 11 looking in the direction of the arrows.

Figure 16 is a perspective view broken away in part of another form which the invention may take and which employs a single gate having two apertures.

Figure 17 is a partial front view of the structure shown in Figure 16.

Figure 18 is a fragmentary front view of a structure embodying the invention in which a gate and a sprocket are cooperatively mounted.

Figure 19 is a partial side view of the structure in Figure 18.

Figure 20 is a detailed view of an alternative locking member which may be used with the structure of Figure 19.

Figure 21 is a side view of latching and protecting mechanism which illustrates means for insuring the use of the proper gate with the proper film feeding means.

Figure 22 is a side view of the structure shown in Figure 21 and illustrates how the gate structure and the sprocket may be locked in place on the apparatus.

The present invention may take one form which for illustrative purposes is shown applied to a motion picture camera of the kind disclosed in the copending application of Barton A. Proctor, Serial Number 187,980, filed April 30, 1927, which has matured into U. S. Patent No. 1,944,033 issued January 16, 1934. It will be evident as the description proceeds that this invention can be advantageously applied to other forms and makes of motion picture cameras as well as to other film handling apparatus such as projectors and printers and film playing phonographs.

This form of the invention is shown as applied to members which are interchangeable between, first, film of two different widths and two different lengths of travel respectively and, second, film of the same width and two different lengths of travel respectively. This second exemplification is useful, for example, in cameras in which a film of sixteen millimeters in width is used for two sets of parallel exposures each eight millimeters in width, later perhaps slit to films of eight millimeters in width, and alternatively for film of sixteen millimeters in width upon which full sized "frames" are exposed occupying the full image-bearing area.

The operable parts of the present invention are shown mounted on a relatively stationary vertical web member 10 and an integral transversely disposed stationary back wall 11. These stationary members form a portion of a usual mounting frame for the motion picture apparatus. A main operating shaft 12 extends through the web 10 and is journalled in a bushing 13 so that it is disposed perpendicularly to the web. If for use in an amateur camera, shaft 12 may be driven by a spring motor and a cooperating gear train (not shown). These driving means may be of the same construction as disclosed in the above noted application, or it may be of well known suitable construction. Or, if for a projector printer, phonograph, or professional camera, an electric motor may be provided. The driving means for rotating the shaft 12 does not form a part of the present invention and a description thereof is not necessary for an understanding of the invention, it is not given.

For mounting a film feeding mechanism on the web member 10, a shoulder screw 14 is fastened on the web member perpendicularly thereto adjacent the back wall 11. On the outer end of the screw 14 is supported the rear end of an oscillating plate member 15, which has an open slot 16 which embraces the screw 14. The plate 15 extends forwardly past the shaft 12 and has an enlarged opening through which the shaft extends. Two cam followers 17 may be formed on the plate member 15 integral therewith and at right angles to the plane thereof, one follower being positioned above the shaft and one below. For co-action with the cam followers 17, a cam 18 may be mounted on the shaft 12 in a way to presently appear and is so designed as to move the plate member up and down. To secure certain of the advantages mentioned herein, means hereinafter described are provided whereby a cam member 18 of one size such for example as may be required in connection with the feeding of 16 millimeter film, may be removed from the shaft 12 and be replaced by a cam member of another size, such for example as may be required in connection with the feeding of 8 millimeter film.

A reciprocating claw finger plate 20 may be slidably mounted on the plate 15 by means of a strap 21 fastened on the plate 20 adjacent its forward end and a strap 22 adjacent its rear end, or such straps may be replaced by structures formed integrally with one member or the other. The plate 20 is provided with an opening and the right and left side edges of the opening are designed to serve as cam followers. The plate 20 is preferably made relatively thin and in such case an integral flange element 24 may be formed along each side edge of the opening to give wider bearing surfaces for an in-and-out cam 25 mounted on the shaft 12 inwardly from the cam 18. The forward end of the plate 20 is formed with an offset at 26 and terminates in two film claw teeth 27 which may be of usual design.

In some cases in carrying out the invention, it may be desirable to provide means for positively holding the film stationary while the teeth 27 are disengaged from the film. Such a retaining means may include a reciprocating plate 30 the rear end of which is provided with an open slot to straddle the screw 14 at a point inwardly from the plate 15. A slot may be provided in the screw 14 for receiving the slotted end of the plate 30. The forward end of the plate 30 may be arranged with an opening for receiving a cam 32 pinned to the shaft 12. The cam 32 will be of suitable design for cooperating with cam follower edges of the opening in the plate member 30 so as to hold the plate member 30 in a retracted position whereby film teeth 33 on the forward end of the plate 30 are withdrawn from perforations in the film while the film is being fed intermittently by the teeth 27. The cam 32 will also be effective to move the teeth 33 into the film perforations at the end of the movement of the film by the teeth 27. The cam 32 may be constructed in a well known way and it is not considered necessary for an understanding of the present invention to describe the construction of this cam specifically. It will be understood by those skilled in the art that the organization of parts which constitute the present invention can be used with other forms of film retaining means, or used without any film retaining means at all, although these film retaining means have especial utility in this invention, as is afterwards pointed out.

In carrying out the invention as illustrated in Figure 1, there is provided a novel improved adjustable gate having interchangeable means for defining a path for a plurality of different widths and lengths of travel of the film in which path the film may be operatively engaged by the film moving teeth 27 and, if of the larger size, by the film retaining teeth 33. This gate may include an upright fixed section, an upper portion of which is designated as 40 and may be fastened in rigid relation to the web 10 at right angles thereto by means presently to appear. A lower portion 41 of the gate is preferably yieldingly mounted on two screws 42 which may extend through over-size holes in a plate 43 fastened on the web member 10 by any suitable means. A leaf spring 44 may be fastened by a screw 45 at a point intermediate its ends to the plate 43 so that the two end portions of the spring bear on the heads of the screws 42. The spring 44 and the screw 45 and the screws 42 may be so adjusted as to hold the gate portion 41 yieldingly in a vertical plane, and slightly offset from the plane of the upright gate portion 40. To cooperate with the fixed gate portions 40 and 41 I provide a novel movable gate section 47 and pivotally mount the same on a stub shaft 48 which is journalled in a tubular bearing member 50 disposed perpendicularly to the web 10 and supported upon the lower or inner side thereof as viewed in Figure 2. The gate section 47 includes an upper relieved gate portion 51 having an aperture 52 and a lower relieved gate portion 53 slightly offset from the upper portion and integrally connected therewith by a web member 54 which extends laterally a short distance beyond the inner side edge of the movable gate section. A portion of the movable gate section is cut away between the upper and lower gate portions 51 and 53 opposite the web portion 54. The end of the stub shaft 48 adjacent the gate section 47 is provided with a diametrical slot for receiving the web member 54 which is suitably attached thereto.

To mount the bearing member 50 on the web member 10, the bearing member is rigidly and integrally joined to one end of a bracket member 55 which extends rightwardly (as viewed in Figure 1) and upwardly (as viewed in Figure 2) and parallel to the stub shaft 48. At the right end of the bracket 55 an integral lug portion 56 is bent at right angles thereto. A slot 57 is cut in the bracket 55 and extends a part of the way thereacross opposite the longitudinal center line of the lug 56. To permit a relatively large head 58 of a mounting screw 60 which is supported by means described hereinafter to engage against the under side of a horizontal body portion 61 of the bracket 56 and to permit the easy removal of the bracket from the apparatus upon loosening the screw 60, an enlarged slot opening 57 is cut in the lug member 56 and in a stiffening flange portion on the opposite side of the body portion 61 from the lug 56.

To support the screw 60, a substantial mounting member 63 may be rigidly fastened to the web 10 and have an opening for receiving the shank of the screw 60. A thumb nut 64 is effective to bind the bracket tightly against the member 63 and thus hold the bracket 55 and lug 56 in rigid relation to the web 10.

It can be seen that the bearing 50 is releasably but rigidly mounted in the motion picture apparatus and the movable gate section 47 mounted on the stub shaft 48 may be removed from the apparatus by simply unloosening the thumb nut 64 and moving the bracket 55 sideways relatively to the web 10.

I am showing the form of the invention illustrated in Figure 1 with three types of interchangeable gate sections, each associated with the appropriate feeding element, to accommodate three different types of film each of which for purposes of illustration may be characterized as follows:

1. A film of the conventional amateur standard of 16 millimeter in width, in which one image alone occupies all of the image-bearing space of each frame. This type is shown in Figure 5.

2. A film of 16 millimeters in width, in which the space occupied by the one image of type 1 above is occupied by four images. Film of this type may be fed in one direction, removed from the apparatus, turned over, re-threaded, and fed again so that a previously unexposed space coincides with the aperture. Obviously, while the width is the same, the feeding stroke and the aperture differ over those for type 1. This type is illustrated in Figure 5a. Alternatively, film of this type may be automatically received, and the aperture shifted.

3. A film of eight millimeters in width and requiring a step or stroke appropriate thereto may be provided. This type is shown in Figure 5b.

In the foregoing and other portions of this specification, reference is made to certain sizes of film. It must be always borne in mind that such references are illustrative only, and that the invention is in no way limited to any specific dimensions. Adaptability to different sizes and standards is the important factor.

With each motion picture machine which embodies this form of the invention shown in Figure 1 a plurality of interchangeable movable gate sections are preferably provided. The distance that a film of the above described type 2 or type 3 is intermittently moved through the gate at each step or pull down is only half the distance of the corresponding movement of a film of type 1 above. It is an important object of the present invention to provide means for changing the extent of the up and down movement of the teeth 27 by the same operation required for changing one movable gate section for another.

To accomplish this object, a bushing 70 is rigidly fastened in each lug 56 perpendicular thereto and positioned so as to be disposed co-axially with the shaft 12 when the bracket 55 is operatively positioned on the camera. The bushing 70 has a round bearing hole for receiving a hub portion 71 which is fastened to the cam 18, that is associated with a 16 millimeter movement for example. The hub portion 71 has an opening 72 arranged with a key slot element 73. The opening 72 is designed to receive with a snug fit the outer end of the shaft 12 in which is fastened a key 74 designed to engage snugly in the slot 73. Thus it can be seen that when a movable gate section for a certain width of film is assembled on a machine, the cam which determines the proper intermittent movement of this particular width of film is automatically provided and necessarily assembled on the machine.

To make sure that an up-and-down or intermittent feeding cam 18 is assembled on the machine so as to provide correct movement of the teeth 27 in relation to the movement of the retaining teeth 33, the key 74 is predeterminedly and correctly positioned relatively to the contour of the cam 32 and the key way 73 is predeterminedly and correctly positioned relatively to the contour of the cam 18 so that when the latter is put in position to engage its cam follower 17 it is secured in proper cooperative relation to the cam 32. Thus there is no possibility of improperly assembling on the machine an interchangeable cam 18, which of course is desirable in any machine, and especially one used by amateurs.

A cut-out section 74 for cooperation with the retaining teeth 33 and an elongated opening 75 for cooperation with the intermittent feeding teeth 27 are provided in the movable gate section 47.

In Figure 5a is illustrated a movable gate 47' for a film of type 2 above, that is to say, one of 16 millimeters in width but demanding feeding movement in steps appropriate for eight millimeter images. In this type of gate section, an aperture 52' having a height appropriate for an 8 millimeter film frame is disposed at one side of the longitudinal center line of the film track. As will be understood by those skilled in the art, when one half of the film is exposed through the aperture 52', the ends of the film are reversed and the film is fed through the gate again so that the aperture 52' can be used for exposing the remaining half of the film. The construction of the gate section of Figure 5a may be substantially the same as disclosed for the gate section of Figure 5.

In Figures 5b and 5c are illustrated a movable gate section 47" for feeding a film of eight millimeters in width and demanding a feeding stroke the same as that of 5a. This gate section 47" may be constructed similar to gate section 47 except as set forth hereinafter. As shown in Figure 5c, the inner edge of the gate section is formed with a cam element 47c for engaging a section 43' of a longitudinally split pressure plate which may lie supported by the member 43 fastened to the web member 10. The pressure plate sections 43' and 43'' may be mounted on screws 42' pressed through the member 43 by springs 44' similar to springs 44. It will therefore be seen that the cam formations 43c to engage one edge of the film thereby defining one edge of the eight millimeter film track. When a sixteen millimeter film is used, both of the longitudinally split pressure plates cooperate to press all of the film into proper relation to the elements opposite thereto. Similar split pressure plates opposite the aperture 52 or 52' may be used. All film contacting members may be relieved in the conventional way.

It will be noted that the gate section structure of Figures 5a and 5b carry a driving cam 18' for moving the claw teeth 27 up and down. To coact with these cams 18' a second cam follower element 17' is provided on the member 15. Each of the gate structures of Figures 5a and 5b is provided with slots 75' for the teeth 27.

Also in the structure of Figure 5a, a notch 74' is provided for the retaining finger 33. In the structure of Figure 5b the notch 74 may be omitted, since the retaining tooth will operate out of the area occupied by the film. The use of the film retaining means with films of type 2 is particularly important in a camera, because the almost microscopic size of the images makes exact placement of each relatively to the other very important since all errors are much exaggerated in projection.

The movable gate section may be urged against the fixed gate section by the following described mechanism.

A thin plate member 80 is slidably mounted against the upper face of the web member 10, as viewed in Figure 2, by strap member 81. At the forward end of the member 80, an integral upward extension 82 as viewed in Figure 1 passes above the pivot of the movable gate section and has a forwardly extending portion 83 provided with a notch 84, each side of which engages its adjacent side edge portion respectively of the upper gate portion 51. Adjacent the rear end of the plate 80 a post 85 is mounted thereon and has fastened to it one end of a spring 86. The other end of this spring is fastened to the head of an adjusting screw 87 which extends rearwardly through the frame part 11 to receive a thumb nut 88. Thus by operating the thumb nut, the movable gate section can be made to engage yieldingly against the fixed gate section with any desired pressure.

To swing the movable gate section to open position for removing or inserting a film, a rear end portion 90 of the plate 80 is bent at right angles and has fastened thereto, a pin 91 which projects rearwardly through a hole in the frame member 11. By simply pressing on the end of the pin 91 the gate may be opened. To permit the film to enter and leave the gate structure of Figure 1 safely the adjacent ends of the gate sections are curved away from each as shown.

It can be readily seen by those skilled in the art that the gate structure and the intermittent feeding means illustrated in Figures 1 and 2 and described hereinbefore may be used with either the Bundick and Proctor system of film feeding or with continuously rotating delivery and take-up sprockets. Suitable latching devices may be provided to hold the gate in open position.

Another embodiment of the invention is illustrated in Figures 6 to 9 inclusive wherein I show clutch members for alternatively operating driving means of different characteristics for the feeding member or members, this clutch being controlled by the movement into and out of operative position of different gate members, each adapted to a film of characteristics corresponding to those for which the particular driving means then rendered operative is adapted.

In this embodiment of the invention, I may removably mount on a web or frame member 100, which may be similar to the web 10 of Figures 1 and 2, a gate for film of one type, say sixteen millimeters, by means of strap devices 101 attached to the frame member 100. This gate may include a fixed gate section 102 having lug members 103 for engaging with a snug fit in the strap devices 101 for holding the gate securely in operative position. For latching the gate on the frame member, detent knobs in the lug members 103 may be provided for engaging the corresponding recesses 104 in the strap devices 101. A light pull on the gate will be sufficient to release it against the holding effect of the detents. Obviously, other holding means may be employed to replace the detents. For a reason presently to appear, the lug members 103 are formed with shoulder elements 105 adjacent the gate 102. It will be seen that these shoulder elements engage the straps 101 and locate the film track of the fixed gate section.

As will be readily understood by those skilled in the art, it is advantageous to use with a gate for a sixteen millimeter film, for example, an objective lens 110 which will be different as to coverage, focal length and other characteristics from the corresponding lens 178 suited for use with an eight millimeter film. Conventional focussing means for the lens 110 may be provided in any well known way and be mounted on the fixed gate section 102 by a supporting member 111 having a transverse foot portion 112 fastened to the gate section by rivets. When the fixed gate section is operatively mounted on the frame member 100 the lens 110 is necessarily positioned in the optical axis of the apparatus.

For cooperation with the fixed gate section 102, I provide a movable gate section 115 mounted by means of hinge elements 116 on the fixed gate section and hinge element 116' on the movable gate section to swing away from the fixed gate section in a well known way. Each of the gate sections 102 and 115 is provided with an aperture 117 centered on the optical axis of the apparatus.

For use with an eight millimeter film, for example, I mount a gate including a fixed gate section 120 in the strap members 101 by means of lug members 121 joined to the fixed gate section. The lug members 121 have detent knobs arranged for engaging in the same detent elements 104 provided in the straps 101 as described above for holding the gate 102 on the mounting plate. The gate section 121 may be relieved in the usual way. For cooperation with the gate section 120, I mount a movable section 122 by means of hinge members 123 on the fixed gate section and hinge members 123' on the movable gate section. The lug members 121 do not have shoulder elements similar to the shoulders 105. Therefore the film track for an eight millimeter film is disposed slightly nearer the front of the apparatus.

For feeding either a sixteen millimeter film or an eight millimeter film through the apparatus intermittently by toothed sprocket means, I provide the following mechanism. A sprocket member generally designated as 125 carries two rows of teeth 126 spaced apart laterally for engagement in the usual perforations of a sixteen millimeter film. Between these rows of teeth there is provided an annular groove 127 the bottom of which is slightly smaller in diameter than the peripheral portion of the sprocket member 125 which carries the teeth 126. The central portion of the groove 127 may be relieved in the usual way, and the width of the groove 127 arranged for receiving an eight millimeter film so that the adjacent shoulder portions of the sprocket member 125 serve as side guides for the eight millimeter film while being fed through the apparatus by two rows of teeth 128 and 129 in the channel 127. In some cases where sixteen millimeter films have been split lengthwise and the eight millimeter films thus provided having perforations only in one side edge are to be fed by the sprocket 125 one of the rows of teeth 128 or 129 may be omitted.

For intermittently revolving the teeth 126 and the teeth 128 and 129 for properly advancing films of different widths distances appropriate to the height of their frames, I rigidly mount the sprocket member 125 on a shaft 130 which may be journaled in a bushing 121 supported in the frame member 100. Near the opposite end of the shaft 130 from the sprocket member 125, there may be mounted a star wheel 132 having a hub 133 loosely i. e. revoluble on the shaft 130 against a collar 134 fixed to the shaft outwardly from the wheel 132. The inner end of the hub 133 is provided with clutch teeth 135 of a well known kind for engagement with coacting clutch teeth 136 on a clutch member 137. The clutch member 137 is arranged to revolve with the shaft and to be moved longitudinally thereof by means of a usual spline member working in a slot 138 in the shaft 130. The clutch member 137 is provided with an annular groove 140, and clutch teeth 136' on the end opposite the teeth 135.

For intermittently advancing an eight millimeter film by the teeth 128 and 129, I provide means for rotating the sprocket member 125 at an appropriate stroke different from that at which it is operated for advancing the sixteen millimeter film which is usually advanced by longer steps than the standard eight millimeter film. For revolving the member 125 intermittently for feeding the eight millimeter film I mount a star wheel 142 having a hub element 143 loosely on the shaft 130 against a collar 144 fastened on the shaft. The opposite end of the hub 143 from the collar 144 is provided with clutch teeth 135' which may be duplicates of the clutch teeth 135 for engaging the clutch teeth 136' formed on the adjacent end of the clutch member 137. As illustrated in Figure 7 the clutch teeth 135 associated with the star wheel 132 are positioned a distance from the clutch teeth 135' of the star wheel 142 greater than the width of the clutch member 137. Therefore only one of these star wheels 132 or 150 can be operatively connected with the clutch member 137 splined to the shaft 130 at the same time. Also, the clutch member 137, as will appear hereinafter, may be disposed between the teeth 135 as to be out of engagement with such teeth associated with either of the star wheels. In such case, the sprocket member 125 can not be operated, as is desirable under certain conditions.

For driving the sprocket 125 at different strokes, there are provided two cam members 150, 151 of well known construction mounted respectively on shafts 152 and 153 which may be supported on a bracket member having two pairs of arms with bearings 154 and 155. The bracket member may be fastened to the frame 100 in any suitable way. The cam member 150 is mounted for cooperation with the star wheel 132 which it will drive intermittently in a well known way. The cam wheel 151 is mounted for cooperation with the star wheel 150 which it will drive in a way similar to the driving of the star wheel 132, by the cam wheel 150 but by such shorter steps as are desirable.

The cam wheels 150 and 151 may be connected by suitable means to a source of power of any suitable kind such as a motor (not shown). The star wheels 150 and 151 will both be driven continuously while the film handling apparatus to which the present invention is applied is being operated.

It will be readily understood that while the star wheels 132 and 150 turn loosely on the shaft 130 no motion will be transmitted to the sprocket member 125. It will be further understood, however, that if the clutch member 137 is brought into engagement with the teeth 135 associated with either the star wheel 132 or the star wheel 150 that such star wheel will become operative to revolve intermittently the sprocket teeth on the sprocket member 125 which are associated with it. The star wheel 132 is associated with the teeth 126 and will cause them to be operatively revolved, and the star wheel 142 is associated with the teeth 128 and 129 and will cause them to be operatively revolved.

It is an important object of the present invention to provide means which will necessarily insure that the star wheel associated with the film being fed through the apparatus is then made effective to revolve its associated sprocket teeth. To accomplish this purpose, a yoke 156 is disposed the annular groove 140 of the clutch member 137 and is carried on an arm 157 of a bell crank device 158 which is pivotally mounted on a pintle 160 carried in a bracket 161 which may be fastened to the frame member 100. The bell crank 158 has another integral arm member 162 extending along the shaft 130 and through an opening 163 in the frame member 100 and thence upwardly to terminate a short distance from the front face of the frame 100. For rocking the bell crank 158, a lever 165 is pivoted at 166 on the frame member 100 and has its lower end connected to the arm 162 by a link 167. A leaf spring member 168 is mounted adjacent the arm 165 and is so constructed that it normally tends to hold the actuating arm 165 in an upright neutral position wherein it will be effective to hold the clutch member 137 in a neutral ineffective position out of engagement with the teeth 135 and 135'.

On the lower end of the eight millimeter gate there is mounted a control finger 170 which is arranged to abut against the lever 165 when the gate is positioned on the frame 100 and move the lever 165 to the Figure 8 position. It will be seen from inspection of Figures 8 and 9 that the finger 170 will move the clutch member 137 into engagement with the teeth of the star wheel 142 thereby making the sprocket 125 effective for intermittently feeding the eight millimeter film for which the gate structure of Figure 8 is arranged.

The gate structure of Figure 6 which is arranged for feeding a film having higher frames than the structure of the Figure 8 is provided with a control finger 171 positioned to engage against the upper end of the lever 165 as shown in Figure 6 when the gate member 102 is being positioned on the frame. This will move the lower end of the lever counterclockwise as viewed in Figure 6 and necessarily connect the star wheel 132 to the sprocket member 125 for operatively revolving the teeth 126 which may be arranged for coaction with a sixteen millimeter film, for example.

It can therefore be seen from the above disclosure that I provided means whereby it is impossible for a user to insert the gate associated with a certain type of film and fail to connect the intermittent feeding means with the source of power for feeding the film through the gate. It will be further noted that while no gate is in operative position in the apparatus the proper intermittent feeding means cannot be operated. Moreover, it will also be understood that since lenses of different characteristics are mounted upon supports having the control formation 170 and 171, the introduction of the appropriate lens into the apparatus is automatically effective to operate the clutch and change the characteristics of the feeding member. Also, with the lens completely removed or not completely put into place, the feeding member cannot be operated as will be understood by those skilled in the art, the above constructions are useful for other purposes than those associated with change of gates.

It can be readily seen by those skilled in the art that the gate structures disclosed in Figures 6 and 8 and the intermittent feeding means associated therewith may be used in connection with the Bundick and Proctor system of controlled tension film feeding or with conventional systems employing continuously operating delivery and taking up members.

According to another embodiment of the invention, an example of which is shown in Figures 10 to 15 inclusive, I may provide two or more constantly operating film feeding means of different characteristics of movement, one operating in one plane and the other operating in a slightly different plane, and one gate with two or more apertures and film guiding surfaces disposed one in the plane of one feeding member and the others in the plane of the other feeding means respectively, the bodily movement of this gate being effective to move the film into relation with the proper feeding means and to move the aperture properly associated with said feeding means into the optical axis of the apparatus, side guides appropriate to that particular film being made operative upon it and presser plates automatically adjusted and the feeding means automatically rendering inoperative during such positioning operation. Such longitudinal movement operates the device. When the gate is disposed in the position shown in Figures 10 and 11, for example, sixteen millimeter film may be fed, all the parts necessary being in operative relative to the film. When the gate is moved downwardly as shown in these figures, an eight millimeter film may be fed, all the necessary operating changes having been made.

In this form of my invention on the frame 200, means are provided for mounting a fixed gate section 201. Such means may include an angle plate 202 which may be constructed with a cross section as shown in Figure 12 and fastened to the plate 200 as by rivets. This mounting means may also include another angle plate 203 disposed on the opposite side of the fixed gate section 201. The gate section 201 includes a body portion 204 disposed transversely to the frame member 200 and having a foot element 205 at right angles to the body member 204. As will be seen from Figures 10 and 12 the parts 202 and 203 provide a channel for receiving the foot element 205 and the adjacent portion of the body member 204 with a snug fit. The gate section 201 is thus mounted in a firm, rigid manner on the plate 200 and is longitudinally movable.

The upper end of the gate section 201 is provided with a flared portion 205' for cooperation with the curved portion 206' of a movable gate section generally designated at 207 which arrangement provides a usual flared mouth for the film. Each of the gate sections 204 and 206 is provided with two apertures. One of these apertures 208 is arranged for frames of a certain height such as for example frames of a sixteen millimeter film. The other and lower aperture 209 as viewed in Figure 11 is arranged for example for use with frames of an eight millimeter film. The gate section 207 is hinged on the fixed section 201 by hinge elements 209' so that the apertures in the gate sections are always in registration with each other when the movable gate section is closed. For normally holding the movable gate section closed, a latching member 210 on the outer edge of the movable gate section may snap over the outer edge of the fixed gate section.

It is a feature of the present form of my invention to provide a simple arrangement of lenses for cooperation with both of the apertures 208 and 209. Such arrangement includes a lens 212 for the aperture 208 and a lens 213 for the aperture 209 both of which are mounted on the same supporting member 214 which is fastened to the fixed gate section. It will therefore be seen that when the gate sections are so moved as to bring either aperture into operative relation with the optical axis X—X of the apparatus, the corresponding lens is also necessarily moved into operative relation with the optical axis of the apparatus.

An intermittent feeding means for cooperation with the movable gate structure of Figures 10 and 11 may be generally constructed like the intermittent film feeding means for Figures 1 and 2 except as noted hereinafter. Such feeding means may include a claw member 220 for advancing film associated with the larger aperture and a claw member 221 for advancing film associated with the smaller aperture 209. Each of these claw members 220 and 221 may be mounted respectively on reciprocating members 222 and 223 respectively. The members 222 and 223 may be of similar construction and operation to the member 20. These reciprocating members may be both driven by cam devices such as have been described hereinbefore in connection with the structures of Figures 1 and 2. These cam devices may be mounted on a shaft 225 carrying a gear 226 meshing with the smaller gear 227 which may be driven by an electric motor 228.

It will be understood that the claw fingers 220 and 221 will both be operatively moving all the time the motor 228 is operating.

It will be understood from the description of the structure of Figure 1 that the claw fingers 220 and 221 each move in and out the same distance for entering the perforations of the film and being withdrawn therefrom. Therefore, it is necessary to provide means whereby the claw finger for the smaller film does not come in contact with the film associated with the larger aperture 208 when such a film is being fed. Otherwise the claw finger 221 would strike the film where there were no perforations and damage it, if not ruin it.

To safeguard the film against being damaged by the claw finger 221, I provide the construction illustrated in Figures 11, 13, 14 and 15 wherein there is provided a film track for the narrower film associated with the claw finger 221 and is set back or behind the track for the film associated with the larger aperture which is movable by the claw finger 220 working through a slot 233. In Figure 13 the fixed gate section is shown arranged adjacent the apertures with a film track 230 for the wider film. In Figure 15 a lower portion of the fixed gate section 204 is shown arranged with a narrower film track 231 for eight millimeter film for example. The film track 231, as can be readily seen is spaced a short distance behind the plane of the track 230 and a bottom portion 232 of the track 231 is provided with a slot 233' for passage of the tooth 221 to reach the film. It will therefore be seen that the finger 221 arranged for cooperation with the track 231 does not need to be as long as the finger arranged for cooperation with the track 230. In other words, the claw finger 221 even when advanced to its farthest extent will stop short of the plane of the sixteen millimeter film track 230.

When a sixteen millimeter film is being fed through the structure of Figure 10, a film pressure plate adjacent the aperture 208 is required. Such a film pressure plate is shown in Figure 13 and includes a plate member 235 set in a wide slot in the hinged gate section 207. The member 235 is provided with a wide groove 236 which has a double function. This groove 236 serves as a relieved portion over the central picture bearing portion of a sixteen millimeter film. When an eight millimeter film is being fed, this groove defines a film track for the eight millimeter film. The plate member 235 has a second or deeper groove or relieved portion 237 for the eight millimeter film. The plate 235 is supported in the movable gate section by fingers 238 mounted on screws 238 which carry springs 239 disposed between the heads of the screws and the fingers 238.

As illustrated in Figure 15 a pressure plate for an eight millimeter film opposite the tooth 221 may include a member 243 having a cross section as shown in Figure 15 and mounted on the movable gate section on screws 241 which carry springs 245 disposed between the heads of the screws and outwardly extending arm members 246 of the pressure plate member 243. Thus it will be seen that the pressure plates of Figures 11, 13 and 15 are resiliently mounted. The working position of the member 243 is indicated by dotted lines in Figure 15.

Since side guides are provided for the eight millimeter film adjacent the aperture 209 and the claw member 221, it is not necessary to provide additional side guides between these points.

Pressure plate means are provided on the plate 243 for the sixteen millimeter film opposite the tooth 220 which include plate members 260 fastened on screws 261 extending through holes in the arms 246 and arranged with springs 262 disposed around the screws. The screws 261 and springs 262 are longer than the screws 247 and their associated springs to permit the plate 243 to be moved inward relatively to the plate member 260. In effect, therefore, I mount an auxiliary spring pressed pressure plate upon a main spring pressed pressure plate, each being movable relatively to the other as the exigencies of the feeding operations demand.

As is clearly shown, notably in Figure 15, I provide simple means to maintain the eight millimeter pressure plate out of pressing relation with the film during the operation of the apparatus for the feeding of sixteen millimeter film. Extending to the right from the main frame 200 as viewed in Figure 15, is a light plate 257 from which project a plurality of fingers 258 working through appropriate slots in the gate members 204, and the hinged plate 206, and against the presser member 235. It will be readily seen that when the whole gate is moved to the position shown in the drawings, these fingers 258 will hold the presser member from pressing the film, but when the plate is moved upwardly to the eight millimeter position, in which this pressure member is needed, it will press against the film, having been removed from contact with the fingers. Alternatively, the sixteen millimeter film may hold this presser member back, as is practical in cheaper apparatus.

To hold the gate in either of the positions, a detent structure, such as indicated by 261' may be provided.

It is obviously desirable that during a change between the two feeding positions, the feeding member be inoperative. This result is simply accomplished, as shown in Figure 10. A conventional spring switch 265 with a trigger 266 which is spring-pressed to a central neutral circuit breaking position and movable to two angular circuit closing positions is provided to control the circuit 267, in which a conventional manual switch 268 is also included, for the motor 228. Two contact formations 269 and 270 extend from the gate member 205. As the gate is moved upwardly as shown in the drawings, the switch 266 immediately snaps into circuit breaking position since the member 269 is removed from contact with it. It remains in this position until the gate is moved into the eight millimeter position when the control formation 270 engages the trigger and closes the circuit automatically. Upon the first portion of the reverse movement, this motor circuit is likewise broken, to remain so until the apparatus is completely disposed in the sixteen millimeter position at which time the switch is snapped on again by the control formation 269. If desired, corresponding mechanism will be employed to operate a clutch.

In apparatus of certain characteristics in which such a connected organization of parts is not possible or desirable, or for other reasons, under certain conditions it may be desirable to construct the removable gate and the removable feeding member or members as independent parts but to provide means whereby it is impossible for a gate of one characteristic of aperture to be erroneously used with a moving member of other characteristics. I have designed several pieces of apparatus accomplishing this result and for purposes of illustration shall now describe one of the most simple:

To either the removable gate or the removable feeding means I may attach a member which extends therefrom or is formed therein and overlies the point of attachment of the other removable element, the over-lying part of this member having an irregular surface formation of some appropriate sort so designed that it is impossible for any but the right element to be used with it.

Examples of such construction are shown in Figures 18, 19 and 20. To a removable gate section 351, constructed for detachable engagement with a frame 352 of the apparatus in the manner previously described or in any other desired way there is attached to the inner or left hand side of the gate 351 as viewed in Figure 18, a key structure 353 with any appropriate irregular surface formation. In detachable engagement, as by means of a bayonet connection, not shown, with a revoluble shaft 354, there may be provided a sprocket 355. Attached to the corresponding portion of this sprocket, there may be provided a key way structure 357 having an irregular surface formation corresponding to that of the key construction 353.

As shown for purposes of example in Figure 20, a key way 359 of a different irregular surface formation may be provided for a sprocket, not shown, adapted for use with another type of film. Similarly a removable gate section, not shown, may be provided for such second type of film, similar to gate 351, this second gate having a key corresponding to that of Figure 20.

Thus it will be seen that when the sprocket of the first type is in position upon the machine, a gate of the second type cannot be placed upon the machine for the respective key and key way will not coincide, and vice versa. If desired, two keys and two key ways, one in one plane on one side of the sprocket and one on the other may be provided. I may make use of a feeding device of the sort in which the shaft 354 is always stopped in the same position.

Another device which I have designed to accomplish the same end makes use of a control member which must be moved to one position to accommodate elements of one dimension and to another position to accommodate elements of another dimension. For use with this device, I prefer to mount the removable portion of the gate of one standard upon a pin (or pins) or other supporting member of a formation different from that of the supporting member upon which I mount the gate of the other standard and positioned differently relatively to the gate supported thereby. As a result of this difference of formation, the gate with an aperture for film of sixteen millimeters in width cannot possibly be placed in the opening designed for the reception of the gate with an aperture for film of eight millimeters in width. Likewise, I provide removable feeding elements with differently formed and differently placed supporting members.

As is shown in Figures 21 and 22 of the drawings, a removable gate section of a first standard may be mounted on means which include a pin 371 with an annular ring 372 which can be placed within an opening in a main frame 373. A feeding member which is adapted for use with a film of the same standard is mounted by means which include the post 374 with an annular ring 375 which may be placed within another appropriate opening in the frame 373. A removable gate section and removable feeding member for film of another standard may be provided with similar mounting means but preferably of another size for cooperation with openings 376 and 377 respectively likewise formed in the frame 373. To hold these pins in place there may be provided an irregularly shaped member 379, preferably a stamping, which is mounted upon headed pins 380 which cooperate with slots 381. Mounted upon this member are latching elements 382 which coact with grooves 372' and 385' in annular rings 372 and 375 mounted upon the pins 371 and 374 and likewise upon the pins for the elements of the standard to hold the pins in place. As is clearly shown in Figure 21, this latching member may be formed with extensions 385 and 386 which upon the movement of the latching member to one position to latch the pins of the elements of one standard cover the openings for the pins for the elements of the other standard, and vice versa. Thus this member not only latches one set of pins into place but at the same time prevents the insertion of the other set of pins. A handle 387 may be provided, and also suitable detent means (not shown), to hold the latching member in either position.

It will readily be understood by those skilled in the art that my invention may also be applied, without change, to the alternative use of black and white prints, requiring a standard one-picture opening and a movement of one picture at a time, and color prints, requiring a two-picture (or greater) opening and a movement of two pictures at one time, with a blending upon the projection screen, by appropriate shutter, filter and/or prism mechanism, of the successive paired frames representing red and green, for example, or by corresponding exposure during the taking of the picture. Likewise the clutch device described above in connection with the off-set cam type of movement, or the removable carriage-cam may be employed, when it is desired to change from one length of film travel to another without changing aperture dimensions. Such mechanical arrangements form an important part of my invention.

Figures 16 and 17 illustrate another embodiment of the invention in which there is provided a longitudinally movable gate structure generally designated as 300 which may be mounted on the frame member 100' by means of angle members 202 and 203 disposed in a plane normal to the frame members 101'. The gate structure 300 may include a relatively fixed gate section 301 which may have film tracks for a plurality of films of different widths defined by two side guide members 302 mounted for joint and equal inward and outward movement. To provide for moving the guide members laterally, I may arrange for cam slots 303 (see Figure 17) in the section 301 and fasten four pins 304 in the guide members 302 for working in the slots 303. By this construction, upward movement of the side edge guides moves them inwardly to form the side edge guides for an eight millimeter film, for example. The gate section 301 may be relieved in a usual way and a suitable movable gate section (not shown) may be movably mounted on the fixed gate section by any suitable means, such as that previously shown. Upon this movable gate section, I may mount two pressure plates, one for film of the larger width and one for that of narrower width, the latter working through an opening in the former and preferably supported thereby, all as previously described.

The gate section 301 may be provided with two apertures 305 and 306 for sixteen and eight millimeter films respectively. Two objective lenses 307 and 308 of different characteristics may be mounted on a bracket member 309 fastened to the fixed gate section for cooperation with the apertures 305 and 306 in the same way as described above for the structure of Figure 10.

To cooperate with the gate section 301 there is provided a sprocket member generally designated as 311 which may be mounted on a shaft 312 which may be journalled in the frame member 100. The sprocket member 311 may include two rows of sprocket teeth 313 arranged for use with a sixteen millimeter film, for example. The portion of the sprocket 311 between the rows of teeth 313 may be cut away a considerable extent for a purpose presently to appear. In the space between the rows of teeth may be provided two rows of teeth 314 for an eight millimeter film, for example. To safeguard the eight millimeter film from the teeth associated with the sixteen millimeter film, establishing edge guides for the eight millimeter film, and stripping the eight millimeter film for the teeth mounted therewith, I provide novel automatic means which includes a guard member 315 which may be shaped as shown in Figures 16 and 17. As is later stated, this guard member performs other functions. This member has a tubular connecting portion 316 disposed around the shaft 312 and connected to a spur gear 317 mounted loosely on the shaft 312 against the frame member 100'. To the gate section 301 is fastened a downwardly extending plate member 320 which has rack teeth 321 cut in it and positioned for engaging the spur gear 317. By this arrangement, when the gate section 301 is moved to the upper position as for use with an eight millimeter film, the guard 315 is revolved to a position at the left (as viewed in Figure 16) of the teeth 313 so that the eight millimeter film is protected from them as it is moved past them. This arrangement is particularly useful while the film is being threaded in the apparatus. Inner faces 322 of annular rim members 323 of the guard member 315 are arranged for serving as side guides for the eight millimeter film.

Formed integrally with this protective member is a protective surface 324 which covers the teeth 314 associated with the eight millimeter film, this surface 324 being oppositely disposed from the surface 323 which protects the film from the sixteen millimeter teeth. Thus it will be understood that when the gate section is disposed in the position shown in Figures 16 and 17, and the teeth 313 associated therewith exposed, the eight millimeter teeth are enclosed so that the sixteen millimeter film cannot be engaged thereby. Thus I provide a duplex sprocket, that is to say, a sprocket with two sets of teeth—and means for alternatively protecting the film from each of said sets.

Automatically to connect the sprocket member 311 with a driving means corresponding to the position of the particular aperture 305 or 306 disposed in operative relation with the optical axis of the apparatus, a lever 330 may be pivotally mounted on the frame 100' adjacent the gate section 301. This lever may have an arm 331 extending toward the gate section 301 in position to be engaged by either of two lugs 332 and 333 fastened on the gate section. To the lower end of the lever 330 (as viewed in Figure 16) is connected a link 335 which may operate to be connected through the arm 162 to a clutch device which may be of the same construction as the clutch device shown in Figures 6 to 9 inclusive and be arranged to connect the sprocket shaft 312 to a suitable source of power (not shown) through cam means such as are illustrated in Figure 6. Thus it will be understood that for example, when the gate section is moved up (as viewed in Figure 16) to bring the eight millimeter aperture to the optical axis, the sprocket is necessarily connected to a source of power that will properly revolve it for intermittently feeding an eight millimeter film. In like manner, the sprocket 313 will be connected to a source of power for feeding sixteen millimeter film. A spring 336 is arranged to function like the spring to move the lever 330 and the clutch (not shown) which it controls to neutral, or ineffective position if neither aperture is at the optical axis.

Alternatively, the link 335 may be used to control a switch for the motor circuit. In such cases, the two sets of sprocket teeth would ordinarily be provided for film of different width but of the same or substantially the same step, and the motor disabled during the adjustment of the apertures.

It will, of course, be understood that the movement of the double stripping shield to and from its two positions is in timed relation to the operation of the clutches for the feeding member. Thus if the user leaves the eight millimeter film upon the teeth of the sprocket, and moves the gate to sixteen millimeter position thus changing the stroke of the feeding member to that required for sixteen millimeter, the eight millimeter film will be at once and automatically removed from the teeth, and vice versa. There are various advantages to such an arrangement. For example, in a camera, if a user carelessly leaves an eight millimeter film in position and operates the feed for sixteen millimeter the film is removed from the teeth. If not so removed, the movement of two frames downwardly with every stroke would ruin the photographic results, even if no other damage resulted.

It should be understood that this double guard or stripper is in itself an important part of this invention. Another important part is the operative interconnection of such a part with the other operable parts of the apparatus.

It will be understood that in all forms of the invention the appropriate and different lenses may be mounted upon the movable or upon each of the removable gate members in proper relation to the appropriate apertures.

The advantages of this invention will be evident from the foregoing portion of this specification, the drawings, and the subjoined claims.

I claim:

1. In a film handling apparatus, a bodily movable gate section having an aperture for one height of film frame and another aperture for another height of film frame; two separate feeding members, each of a feeding stroke of different length, mounted to cooperate with said movable gate section, one for feeding thereby a film associated with said first named aperture and the other for feeding thereby a film associated with said second named aperture, a film track on said gate section associated with the first named aperture, a film track on said gate section associated with said second named aperture, said second named track being disposed to the rear of the vertical plane of said first named track, whereby the feeding member associated with said second named track may engage a film placed therein without danger of interference with a film which may be placed in said first named track, and gate control means for moving said tracks, each transversely to its associated film path into film-engaging relation with its associated film feeding member.

2. In a film handling apparatus, means for feeding a film having frames of one height, means for feeding a film having frames of a height different from that of said first mentioned film, means for rendering either of said feeding means selectively operable upon the film associated therewith, movable means for supporting two objective lenses, one for use with each of said film frames, means for moving said supporting means for bringing the axis of either of said lenses into operative relation with the optical axis of said apparatus, and a connection between said movable supporting means and said means for rendering said feeding means selectively operable upon the films for operating said last named means upon the movement of said lens supporting means.

3. In the film handling apparatus, means for feeding a film having frames of one height, means for feeding a film having frames of a different height, means for selectively driving either of said feeding means, two objective lenses, one associated with each of said film frames, means for moving either of said lenses into cooperative relation with the optical axis of said apparatus, and mechanism operatively interconnecting said moving means and each of said feeding means for moving the desired lens to its work position relative to the said optical axis concomitantly with the actuating of the corresponding feeding means.

4. In a film handling apparatus, movable film contacting and guiding means having an aperture for one height of film frame and another aperture for another height of film frame, an objective lens associated with said first named aperture and an objective lens associated with said second named aperture, each of said lenses being mounted on a support for bodily movement into and out of operative relation to the optical axis of the apparatus, means for selectively moving said film contacting and guiding means for bringing the desired aperture into operative relation with the optical axis of said apparatus, and means made effective by the selected movement of said film contacting and guiding means for simultaneously moving the lens associated with the aperture which is moved into operative relation with the optical axis of said apparatus into such relation with said axis.

5. In a film handling apparatus, a gate having an aperture of appropriate size for a first height of film frame and another aperture of appropriate size for a second and different height of film frame, an objective lens for use with the film frame of said first height, an objective lens for use with the film frame of said second height, means for mounting said gate upon said apparatus for bodily movement in relation thereto, means for supporting said objective lenses upon said gate, each in cooperative relation to the corresponding aperture, and means for bodily moving said gate for bringing either of said apertures and its corresponding lens into coaxial relation with the optical axis of said apparatus.

6. In a film handling apparatus, a gate having an aperture for one height of film frame and another aperture for another height of film frame, an objective lens for use with the film frame of the first named height, an objective lens for use with the film frame of the second named height, means for mounting said gate upon said apparatus for bodily movement in relation thereto, means for mounting said objective lenses upon said gate in cooperative relation to said apertures, means for bodily moving said gate for bringing either of said apertures and its associated lens into cooperative relation with the optical axis of said apparatus, means for feeding the film having the first named height of frame through said apparatus, means for feeding the film having the second named height of frame through said apparatus, and means rendering said feeding means inoperative while the aperture and objective lens for one height of film frame are being changed to bring into operative relation with the optical axis an aperture and corresponding objective lens for another height of film frame.

7. In a film handling apparatus, a gate having an aperture for one height of film frame and another aperture for another height of film frame, an objective lens for use with the film frame of the first named height, an objective lens for use with the film frame of the second named height, means for mounting said gate upon said apparatus for bodily movement in relation thereto, means for mounting said objective lenses upon said gate each in fixed cooperative relation to its associated aperture, means for bodily moving said gate for bringing either of said apertures into cooperative relation with the optical axis of said apparatus, means for feeding the film having the first named height of frame through said apparatus, alternative means for feeding the film having the second named height of frame through said apparatus, means for rendering said feeding means inoperative while the aperture and objective lens for one height film frame are being changed to bring an aperture and corresponding objective lens for another height of film frame into operative relation with the optical axis, said feeding means including an electric motor, and said means rendering said feeding means inoperative including an electric switch, and means operatively connected with said gate for operating said electric switch to stop said motor upon movement of the gate in said apparatus in either direction for moving the apertures therein.

8. In a film handling apparatus, a gate including a movable gate section having an aperture of appropriate size for a first height of film frame and another aperture of appropriate size for a second height of film frame different from said first height of film frame, an objective lens for use with the film frame of said first height, an objective lens for use with the film frame of said second height, a fixed gate section having a film path therethrough, means for mounting said movable gate section upon said fixed gate section for bodily movement along the film path through said fixed gate section, means for mounting said objective lenses upon said movable gate section, each in fixed relative cooperative relation to the corresponding aperture, means for feeding a film having a frame of said first height through said gate, means for feeding a film having a frame of said second height through said gate, an electric motor for driving both of said feeding means, and means operable by said movable gate section for making that one of said film feeding means effective which corresponds to the aperture then at the optical axis of said apparatus.

9. In a film handling apparatus, a gate including a movable gate section having an aperture of appropriate size for a first height of film frame and another aperture of appropriate size for a second height of film frame different from said first height of film frame, an objective lens for use with the film frame of said first height, an objective lens for use with the film frame of said second height, a fixed gate section defining a film path therethrough, means for mounting said movable gate section upon said fixed gate section for bodily movement along the film path through said fixed gate section, means for mounting said objective lenses upon said movable gate section, each in fixed cooperative relation to the corresponding aperture, means for feeding a film having a frame of said first height through said gate, means for feeding a film having a frame of said second height through said gate, an electric motor for driving both of said feeding means, means operable by said movable gate section for making that one of said film feeding means effective which corresponds to the aperture then at the optical axis of said apparatus, and means carried by said movable gate section for stopping said motor while moving one of said apertures out of operative relation to the optical axis of the apparatus and moving the other of said apertures into operative relation with the optical axis of said apparatus.

10. In a film handling apparatus having means for guiding films of two different widths and having perforations of different vertical spacing and disposed along a side edge thereof, a single sprocket having one set of teeth spaced therearound for engaging and feeding one of said films, and a different set of teeth for engaging and feeding the other of said films, the teeth for feeding the narrower of said films being positioned in lateral relation to the teeth for feeding the wider of said films, means connected to said film guiding means to be operated automatically thereby for rendering one of said sets of teeth inaccessible by that one of said films which is then being guided by said guiding means in said apparatus, and means concomitantly rendering the other set of teeth accessible for engagement by said last mentioned film.

11. In a film handling apparatus adapted to handle perforated films of a plurality of different widths and each having perforations of different spacing, toothed means for feeding a wider of said films, toothed means for feeding a narrower of said films, means operable during the feeding of the first of said films for protecting said first of said films from the teeth adapted for the feeding of the second of said films, means operable for defining the edges of two paths one of a size appropriate for said first film and the other of a size appropriate for said second film, and control means operatively interconnecting said protective means and said path defining means for operating both of the same.

12. In a film handling apparatus, a movably mounted gate adapted for movement to one position for guiding a film of one frame height, and to another position for guiding a film of another frame height, a sprocket having two rows of teeth spaced for feeding said film of one frame height, said sprocket also having two rows of teeth spaced for feeding said film of another frame height and another width less than the width of the film fed by the first named teeth, and means operably connected to said gate for movement thereby into position for shielding the teeth which feed the first named wider film while the narrower film is being threaded through the apparatus in relation to the teeth for feeding the narrow film.

13. A sprocket having two rows of teeth spaced for feeding a film having a certain frame height, two rows of teeth spaced intermediate said first named rows of teeth arranged for feeding a film of a frame height different from said first named height, a trough-like member partly enclosing each row of said first named rows of teeth, a mounting for said trough-like members for revolving the same coaxially with the said sprocket teeth, a member connecting said trough-like members and movable to a position wherein it extends partly around the teeth disposed intermediate the first named teeth and thereby protects the film from the intermediate teeth, and means for moving said mounting thereby revolving said trough-like members and moving said intermediate member for rendering one of said sets of rows of teeth accessible by a film and the other of said rows inaccessible.

14. A sprocket having two rows of teeth spaced for feeding a film having a certain frame height, two rows of teeth arranged intermediate said first named rows of teeth and spaced for feeding a film of a lesser frame height than said first named height, an arcuate trough-like member partly enclosing each row of said first named teeth, a mounting for said trough-like members for revolving the same coaxially with said sprocket teeth, a member connecting said trough-like members and movable to a position wherein it extends partly around the teeth disposed intermediate the first named teeth and thereby protects the film from the intermediate teeth, said connecting member being disposed substantially opposite the central portions of said trough-like members and having an arcuate form corresponding to the circumference of said intermediate teeth portions, and means for moving said mounting thereby revolving said trough-like members and moving said connecting member for rendering said rows of intermediate teeth inaccessible by a film and the outer of said rows of teeth accessible by the film.

15. In a motion picture apparatus, in combination, a revoluble film feeding sprocket having two annular ridges extending therearound and a groove portion between said ridges, a row of teeth on at least one of said ridges spaced therearound for feeding a film of one width, and at least one row of teeth spaced around said sprocket in said groove portion between said ridges for feeding a film narrower than said first named film, means operable for revolving said sprocket for alternatively feeding each of said films, and guiding means movable circumferentially about said sprocket in spaced relationship thereto and to a predetermined guiding position between said ridges wherein they serve as side edge guides for said narrow film.

16. In a film handling apparatus having a film path, a gate section movable along the film path from a first position to a second position, means carried by said gate for defining a first film track when in said first position, means carried by said gate for defining a second and narrower film track when in said second position, an intermittent feeding means mounted for cooperation with said gate section, said intermittent feeding means including a claw member for feeding the film when said gate member is in said first position, said feeding means including another claw member for feeding the film when said gate section is in said second position, and means for preventing either of said claw members from injuring the film being fed by the other claw member, said preventive means including a portion of said gate section which defines said second film track being disposed nearer said claw members than the other portion of said gate section which defines the film track, said preventive means further including a construction for one of said claw members whereby it is shorter than the other of said claw members and is disposed for engaging the film only when it is disposed in said track nearest said claw members, said preventive means further including a mounting for said claw for said wider track whereby said claw for said wider track passes to one side of the film in said narrow track.

17. In a film handling apparatus, a gate section movable in a plane at right angles to the optical axis of said apparatus from a first position to a second position, said gate section having a first aperture and a second aperture of a size different from that of said first aperture, an objective lens for cooperation with said first aperture, an objective lens for cooperation with said second aperture, and means for mounting both of said objective lenses on said gate section for the selective movement of either of said lenses into coaxial relation with the optical axis.

18. In a film handling apparatus adapted for use with a first film having frames of one height and with a second film having frames of a height different from said first named height, revoluble toothed means for feeding both of said films, driving means for revolving said feeding means for selectively feeding said first film a distance equal to the frame height thereof and said second film through a distance equal to the frame height thereof, means operable for defining for cooperation with said feeding means, a path for said first film and a path for said second film different from said first named path, and means interconnecting said path defining devices and said driving means for controlling the revolution of said feeding means in accordance with that one of said film paths which is defined in said apparatus.

19. In a film handling apparatus, a gate having a movable first means for defining a portion of a work path for a first film of one height of frame, and a movable second means for defining a portion of a work path for a second film having a height of frame different from said first named height, toothed feeding means for each of said films, driving means for both of said feeding means, means operable for connecting said driving means with either of said feeding means for selectively feeding said first and second films, and means inter-connecting said path defining means of said gate and said connecting means for operating the latter in accordance with the film path defined in said gate.

20. In a film handling apparatus adapted for use with a plurality of films, each having a width materially different from that of the other of said films, a gate, side edge film guiding means operable for defining in cooperation with said gate a plurality of film paths of different widths, a separate path being definable for each of said films, said guiding means including a member movable lengthwise of said gate having two apertures each for a different height of film frame, and means connected with said member and operable upon the lengthwise movement of said guiding member for adjusting said film guiding means laterally with respect to the long axis of said apertures, said gate further including means for stopping said movable guiding member and said apertures in a plurality of operative positions, said movable guiding member being effective in each of said positions for controlling said film guiding means for defining a film path of a width different from the film path corresponding to another position of said guiding member.

21. In a film handling apparatus adapted for the alternative handling of film of different widths and with image bearing portions of different heights between the lateral limits of the same film path through said apparatus, a first toothed feeding means arranged for operatively engaging at least one perforated side edge of a first of said films for intermittently feeding said first film with an effective feeding stroke of a given length, a first guiding means operatively connected with said first feeding means for defining a feeding path for said first film of a given width, a second toothed feeding means arranged for operatively engaging at least one perforated side edge of a second of said films for intermittently feeding said second film with an effective feeding stroke of a length different from that of said first feeding means, a second guiding means operatively connected with said second feeding means for defining a feeding path for said second film of a width different from that of said first film, said first and second toothed feeding means each being always mounted on said apparatus to be selectively disposed at different times in feeding relation to the corresponding film, means for assuring the use of said first feeding and guiding means together and assuring the use of said second feeding and guiding means together, an objective lens corresponding to said first film, and objective lens corresponding to said second film, and a connection between both of said guiding means and both of said lenses for assuring the use of the proper lens with the corresponding film.

22. In a film handling apparatus, a gate having a movable first means for defining a portion of a work path for a first film of one height of frame and a movable second means for defining a portion of a work path for a second film having a height of frame different from said first named height, toothed feeding means for each of said films, driving means for both of said feeding means, means operable for connecting said driving means with either of said feeding means for selectively feeding said first and second films, said driving means including a revolving shaft, said connecting means including a first clutch element idly mounted on said shaft and operatively connected with said toothed means for feeding said first film, a second clutch element idly mounted on said shaft and operatively connected with said toothed means for feeding said second film, and a clutch means having a splined mounting on said shaft to revolve therewith, said clutch means being bodily movable into operative engagement with either said first or said second clutch elements, and means interconnecting said path defining means of said gate and said clutch means for operatively moving the latter in accordance with the film path defined in said gate.

23. In a film handling apparatus, a gate having a movable first means for defining a portion of a work path for a first film of one height of frame and a movable second means for defining a portion of a work path for a second film having a height of frame different from said first named height, toothed feeding means for each of said films, driving means for both of said feeding means, means operable for connecting said driving means with either of said feeding means for selectively feeding said first and second films, said driving means including a revolving shaft, said connecting means including a first clutch means idly mounted on said shaft and having a connection with said toothed means for operating them intermittently to feed said first film, a second clutch means idly mounted on said shaft and having a connection with said toothed means for operating them intermittently to feed said second film, and a third clutch means having a splined mounting on said shaft to revolve therewith, said third clutch means being bodily movable into operative engagement with either said first or said second clutch elements, and means interconnecting said path defining means of said gate and said third clutch means for necessarily moving the latter into engagement with that one of said idly mounted clutch means which corresponds to the film path defined in said gate.

24. In a film handling apparatus, a gate having a movable first means for defining a portion of a work path for a first film of one height of frame and a movable second means for defining a portion of a work path for a second film having a height of frame different from said first named height, toothed feeding means for each of said films, driving means for both of said feeding means, means operable for connecting said driving means with either of said feeding means for selectively feeding said first and second films, said driving means including a revolving shaft, said connecting means including a first clutch element idly mounted on said shaft and operatively connected with said toothed means for feeding said first film, a second clutch element idly mounted on said shaft and operatively connected with said toothed means for feeding said second film, and a clutch means having a splined mounting on said shaft to revolve therewith, said clutch means being bodily movable into operative engagement with either said first or said second clutch elements, and mechanism connecting said path defining means of said gate and said clutch means for necessarily moving the latter to disconnect it from one of said clutch elements and to connect it with the other clutch element when the film path defined in said gate is changed to accommodate a film having a different height of frame.

25. In a film handling apparatus, a gate having a movable first means for defining a portion of a work path for a first film of one height of frame, and a movable second means for defining a portion of a work path for a second film having a height of frame different from said first named height, toothed feeding means for each of said films, driving means for both of said feeding means, means operable for connecting said driving means with either of said feeding means for selectively feeding said first and second films, said driving means including a revolving shaft, said connecting means including a first clutch element idly mounted on said shaft and operatively connected with said toothed means for feeding said first film, a second clutch element idly mounted on said shaft at a distance from said first clutch element and operatively connected with said toothed means for feeding said second film, and a third clutch element having a splined mounting on said shaft and positioned between said first and second clutch elements, said third clutch element having teeth on each end, each of said first and second clutch elements each having teeth on the end thereof adjacent said third clutch element, the teeth of said third clutch element being movable into operative engagement with either the teeth of said first or of said second clutch element, and means interconnecting said path defining means of said gate and said third clutch element for operatively moving the latter to connect said driving means with the feeding means associated with the film path then defined in said gate.

WARREN DUNHAM FOSTER.